United States Patent
Nguyen et al.

(10) Patent No.: US 7,261,157 B2
(45) Date of Patent: Aug. 28, 2007

(54) METHODS OF CONTROLLING PARTICULATE SEGREGATION IN SLURRIES

(75) Inventors: Philip D. Nguyen, Duncan, OK (US); Matthew E. Blauch, Duncan, OK (US); Thomas D. Welton, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 360 days.

(21) Appl. No.: 11/009,293

(22) Filed: Dec. 8, 2004

(65) Prior Publication Data

US 2006/0118299 A1   Jun. 8, 2006

(51) Int. Cl.
*E21B 43/04* (2006.01)
*E21B 43/22* (2006.01)
*E21B 43/267* (2006.01)

(52) U.S. Cl. .................. 166/278; 166/279; 166/280.2; 166/281; 166/300; 166/308.5; 507/224; 507/226; 507/237; 507/238; 507/267; 507/904; 507/924

(58) Field of Classification Search ................ 166/278, 166/279, 280.2, 281, 295, 300, 308.5; 507/224, 507/226, 237, 238, 267, 904, 924; 427/221; 428/407
See application file for complete search history.

(56) References Cited

U.S. PATENT DOCUMENTS

| | | | | |
|---|---|---|---|---|
| 3,239,006 A | * | 3/1966 | Fast | 166/280.1 |
| 4,665,988 A | * | 5/1987 | Murphey et al. | 166/295 |
| 5,128,390 A | * | 7/1992 | Murphey et al. | 523/130 |
| 5,381,864 A | * | 1/1995 | Nguyen et al. | 166/280.1 |
| 5,924,488 A | * | 7/1999 | Nguyen et al. | 166/280.1 |
| 6,311,773 B1 | | 11/2001 | Todd et al. | 166/280 |
| 6,439,309 B1 | * | 8/2002 | Matherly et al. | 166/276 |
| 6,729,404 B2 | * | 5/2004 | Nguyen et al. | 166/280.2 |
| 7,032,667 B2 | * | 4/2006 | Nguyen et al. | 166/280.2 |
| 7,131,491 B2 | * | 11/2006 | Blauch et al. | 166/276 |
| 2005/0277554 A1 | * | 12/2005 | Blauch et al. | 507/224 |
| 2006/0048943 A1 | * | 3/2006 | Parker et al. | 166/308.1 |
| 2006/0113078 A1 | * | 6/2006 | Nguyen et al. | 166/280.2 |

* cited by examiner

*Primary Examiner*—George Suchfield
(74) *Attorney, Agent, or Firm*—Robert A. Kent; Baker Botts

(57) ABSTRACT

Methods for controlling particulate segregation comprising providing a mixture of an aqueous tackifying composition with a treatment fluid; slurrying the mixture with a first type of solid particulates and a second type of solid particulates and wherein the first type of solid particulates have a tendency to segregate from the second type of solid particulates when slurried into a liquid; and, placing the slurry into a portion of a subterranean formation. Methods for controlling particulate segregation comprising providing a treatment fluid; at least partially coating with an aqueous tackifying composition: a first type of solid particulates and a second type of solid particulates and wherein the first type of solid particulates have a tendency to segregate from the second type of solid particulates when slurried into a liquid; slurrying the two types of particulates into the treatment fluid; and, placing the slurry into a portion of a subterranean formation.

49 Claims, No Drawings

METHODS OF CONTROLLING PARTICULATE SEGREGATION IN SLURRIES

BACKGROUND OF THE INVENTION

The present invention relates to subterranean operations using slurries and, more particularly, to methods and compositions for reducing particle segregation in slurries.

Subterranean operations often utilize slurries of solid particulates. One such operation is hydraulic fracturing—a production stimulation wherein a formation is treated to increase its permeability by hydraulically fracturing the formation to create or enhance one or more cracks or "fractures." In most cases, a hydraulic fracturing treatment involves pumping a proppant-free, viscous fluid (known as a pad fluid) into a subterranean formation faster than the fluid can escape into the formation so that the pressure in the formation rises and the formation breaks, creating an artificial fracture or enlarging a natural fracture. Then proppant particulates are generally added to the fluid to form a slurry that is pumped into the fracture to prevent the fracture from closing when the pumping pressure is released.

An example of a well completion operation using solid particulates is gravel packing. Gravel packing treatments are used, inter alia, to reduce the migration of unconsolidated formation particulates into the well bore. In gravel packing operations, particulates known in the art as gravel are carried to a well bore by a treatment fluid. That is, the particulates are slurried in a treatment fluid, which may be viscosified, and the treatment fluid is pumped into a well bore in which the gravel pack is to be placed. The treatment fluid leaks off into the subterranean zone and/or is returned to the surface while the particulates are left in the zone. The resultant gravel pack acts as a filter to separate formation sands from produced fluids while permitting the produced fluids to flow into the well bore. Typically, gravel pack operations involve placing a gravel pack screen in the well bore and packing the surrounding annulus between the screen and the well bore with gravel designed to prevent the passage of formation sands through the pack. The gravel pack screen is generally a type of filter assembly used to support and retain the gravel placed during the gravel pack operation. Such gravel packs may be used to stabilize the formation while causing minimal impairment to well productivity. The gravel, inter alia, acts to prevent formation sands from occluding the screen or migrating with the produced fluids, and the screen, inter alia, acts to prevent the gravel from entering the well bore.

In some situations the processes of hydraulic fracturing and gravel packing are combined into a single treatment to provide stimulated production and an annular gravel pack to reduce formation sand production. Such treatments are often referred to as "frac pack" operations. In some cases, the treatments are completed with a gravel pack screen assembly in place, and the hydraulic fracturing treatment being pumped through the annular space between the casing and screen. In such a situation, the hydraulic fracturing treatment usually ends in a screen out condition creating an annular gravel pack between the screen and casing. This allows both the hydraulic fracturing treatment and gravel pack to be placed in a single operation.

To prevent the subsequent flow-back of proppant, gravel, or other particulates with the produced fluids, a portion of the proppant introduced into the fractures may be coated with a tackifying agent that may facilitate the consolidation the proppant particles in the fracture. Typically, the coated proppant is deposited in the fracture after a large quantity of uncoated proppant has been deposited therein. The partially closed fractures apply pressure to the coated proppant particulates whereby the particulates are forced into contact with each other while the tackifying agent enhances the grain-to-grain contact between individual proppant particles. The action of the pressure and the proppant coating bring about the consolidation of the proppant particles into a permeable mass having compressive and tensile strength, serving to prevent unconsolidated proppant and formation sand from flowing out of the fractures with the produced fluids and damaging production equipment and/or the potential production of the well.

The use of such tackifying agents has proven particularly useful in hydrocarbon and water production. Tackifying agents, by their nature, remain sticky or retain adhesive character even after being placed in the formation. Thus, as formation fines attempt to flow through the pack with formation fluids, they can become entrained with the tackifying agent so as to not be produced with produced fluids. Tackifying agents may have some disadvantages, however. For example, traditional tackifying agents typically transform the carrier fluid to make it a hydrocarbon-based or non-aqueous carrier fluids, which may prove problematic in certain surface terrestrial, aquatic, or marine environments. Additionally, traditional agents often fail to provide the highly elastic proppant-to-proppant bond that is desirable in certain subterranean formations.

Furthermore, some fracturing, gravel packing, and frac-packing treatments are made more difficult due to problems with proppant placement. Often, it would be desirable to place proppant slurries containing a substantially uniform mixture of heterogeneous particles, such as different proppant materials or non-proppant solid particulates, to take advantage of properties offered by the mixture of materials. However, due to differences in, inter alia, settling rate, density, or size, these materials may segregate themselves during pumping and placement. This may result in a heterogeneous mixture, rather than the desired homogeneous mixture of materials, reducing the effectiveness of the proppant placement and possibly limiting the production potential of the well.

SUMMARY OF THE INVENTION

The present invention relates to subterranean operations using slurries and, more particularly, to methods and compositions for reducing particle segregation in slurries.

Some embodiments of the present invention provide methods for controlling particulate segregation within slurries comprising providing a mixture of an aqueous tackifying composition with a treatment fluid; creating a slurry by slurrying into mixture of an aqueous tackifying composition with a treatment fluid: a first type of solid particulates and a second type of solid particulates and wherein the first type of solid particulates have a tendency to segregate from the second type of solid particulates when slurried into a liquid; and, placing the slurry into a portion of a subterranean formation.

Other embodiments of the present invention provide methods for controlling particulate segregation within slurries comprising providing a treatment fluid; at least partially coating with an aqueous tackifying composition: a first type of solid particulates and a second type of solid particulates and wherein the first type of solid particulates have a tendency to segregate from the second type of solid particulates when slurried into a liquid; creating a slurry by slurrying into the treatment fluid the at least partially coated first type of solid particulates and a second type of solid particulates; and, placing the slurry into a portion of a subterranean formation.

Other embodiments of the present invention provide methods for forming a proppant pack within a portion of a subterranean formation, comprising providing a treatment fluid comprising a fracturing fluid and an aqueous tackifying composition; creating a slurry by slurrying into the treatment fluid: a first type of solid particulates and a second type of solid particulates and wherein the first type of solid particulates have a tendency to segregate from the second type of solid particulates when slurried into a liquid; and, introducing the slurry into a fracture within the portion of the subterranean formation so as to form a proppant pack comprising a substantially uniform mixture of the first type of solid particulates and the second type of solid particulates.

Other embodiments of the present invention provide methods for forming a proppant pack within a portion of a subterranean formation, comprising providing a fracturing fluid; at least partially coating with an aqueous tackifying composition: a first type of solid particulates and a second type of solid particulates and wherein the first type of solid particulates have a tendency to segregate from the second type of solid particulates when slurried into a liquid; creating a slurry by slurrying into the fracturing fluid the at least partially coated first type of solid particulates and a second type of solid particulates; and, introducing the slurry into a fracture within the portion of the subterranean formation so as to form a proppant pack comprising a substantially uniform mixture of the first type of solid particulates and the second type of solid particulates.

Other embodiments of the present invention provide methods for forming a gravel pack within a portion of a subterranean formation, comprising providing a treatment fluid comprising a gravel packing fluid and an aqueous tackifying composition; creating a slurry by slurrying into the treatment fluid: a first type of solid particulates and a second type of solid particulates and wherein the first type of solid particulates have a tendency to segregate from the second type of solid particulates when slurried into a liquid; and, introducing the slurry into a portion of a well bore within the portion of the subterranean formation so as to form a gravel pack comprising a substantially uniform mixture of the first type of solid particulates and the second type of solid particulates.

Other embodiments of the present invention provide methods for forming a gravel pack within a portion of a subterranean formation, comprising providing a gravel packing fluid; at least partially coating with an aqueous tackifying composition: a first type of solid particulates and a second type of solid particulates and wherein the first type of solid particulates have a tendency to segregate from the second type of solid particulates when slurried into a liquid; creating a slurry by slurrying into the gravel packing the at least partially coated first type of solid particulates and a second type of solid particulates; and, introducing the slurry into a portion of a well bore within the portion of the subterranean formation so as to form a gravel pack comprising a substantially uniform mixture of the first type of solid particulates and the second type of solid particulates.

The features and advantages of the present invention will be readily apparent to those skilled in the art upon a reading of the description of the preferred embodiments that follows.

DESCRIPTION OF PREFERRED EMBODIMENTS

The present invention relates to subterranean operations using slurries and, more particularly, to methods and compositions for reducing particle segregation in slurries.

In accordance with the teachings of the present invention, an aqueous tackifying composition may be used to create a substantially uniform proppant slurry comprising heterogeneous particles having a tendency to segregate. This tendency to segregate may be caused, inter alia, by differing densities, sizes, or settling rates of the particles. Once tackified, however, the heterogeneous particles tend to adhere to each other to form pliable, reformable clusters, reducing the tendency of the particles to significantly segregate when slurried into a liquid. In particular embodiments, the aqueous tackifier compounds of the present invention may be used to place lightweight particulates along with denser particulates. The aqueous tackifying compositions of the present invention may also be used to help place non-proppant and non-gravel solid particulates, such as an encapsulated acid or a solid breaker, along with proppant particulates. The aqueous tackifying compositions suitable for use in the present invention comprise an aqueous liquid and an aqueous tackifier compound.

In some embodiments of the present invention the particulates that have a tendency to segregate are themselves at least partially coated with an aqueous tackifying composition. In other embodiments of the present invention, the particulates are slurried into a treatment fluid and the treatment fluid itself comprises an aqueous tackifying composition that may than mix with the disparate particulates and tends deter segregation.

In some embodiments of the present invention the particulates having a tendency to segregate may be a mixture of proppant/gravel particulates (that is, particulates designed for use in a fracturing operation to bear the load of a propped fracture) along with non-proppant/gravel particulates (described below). In other embodiments of the present invention the particulates having a tendency to segregate may be a mixture of disparate proppant/gravel particulates. Such disparate proppant particulates may vary in size, shape, density, settling rate, or some combination thereof. In still other embodiments of the present invention the particulates having a tendency to segregate may be a mixture of disparate proppant/gravel particulates and non-proppant/gravel particulates.

Proppant and gravel particulates suitable for use in the present invention may be comprised of any material suitable for use in subterranean operations. Suitable particulate materials include, but are not limited to, sand; bauxite; ceramic materials; glass materials; polymer materials; TEFLON® (polytetrafluoroethylene) materials; nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates and combinations thereof. Composite particulates may also be suitable, suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Typically, the particulates have a size in the range of from about 2 to about 400 mesh, U.S. Sieve Series. In particular embodiments, preferred particulates size distribution ranges are one or more of 6/12 mesh, 8/16, 12/20, 16/30, 20/40, 30/50, 40/60, 40/70, or 50/70 mesh. It should be understood that the term "particulate," as used in this disclosure, includes all known shapes of materials including substantially spherical materials, fibrous materials, polygonal materials (such as cubic materials) and mixtures thereof.

In particular embodiments, non-proppant/gravel solid particulates may also be included with the proppant/gravel particles. These non-proppant/gravel particulates may or may not be used to bear the pressure of a closed fracture. Examples of suitable non-proppant/gravel solid particulates include, but are not limited to, scale inhibitors, gel breakers, hydrate inhibitors, corrosion inhibitors, paraffin removers, salts, and encapsulated acids.

As mentioned above, due to differences in the physical properties of the heterogeneous particulates, the heterogeneous particulates may have a tendency to segregate. This may be due, inter alia, to differences in density, size, shape, or settling rate. Such segregation is often undesirable, particularly in subterranean operations wherein a substantially uniform mixture of particulates is desirable. For example, in nearly all subterranean operations in which a non-proppant solid particulate is placed along with a proppant particulates to form a proppant pack, uniform distribution of the non-proppant particulate throughout the proppant pack is desired. Such subterranean operations include those placing, for example, a gel breaker within the matrix wherein uniform placement will aid in a uniform break of the gel and thus aid cleanup once the operation is complete. Another operation wherein uniform placement is desirable is in situations wherein the non-proppant particulate is used to degrade a filter cake on the walls of a fracture or well bore abutting a proppant pack or gravel pack. In that case, uniform placement aids in a uniform removal of the filter cake.

To help offset or reduce this tendency to segregate, at least a portion of the proppant/gravel and/or at least a portion of the non-proppant/gravel particulates that are at least partially coated with an aqueous tackifying composition comprising an aqueous liquid and an aqueous tackifier compound. Generally, the aqueous tackifier compounds of the present invention comprise charged polymers that, when in an aqueous solvent or solution, will form a non-hardening coating and, when placed on a particulate, will increase the continuous critical resuspension velocity of the particulate when contacted by a stream of water (further described in Example 1, below). The aqueous tackifier compound enhances the grain-to-grain contact between the individual particulates within the formation (e.g., proppant particulates, formation fines, or other particulates), and may help bring about the consolidation of the particulates into a cohesive, flexible, and permeable mass. Some suitable aqueous tackifier compounds are described below, but additional detail on suitable materials can be found in U.S. patent application Ser. No. 10/864,061 filed Jun. 9, 2004 and in U.S. patent application Ser. No. 10/864,618 filed Jun. 9, 2004, the relevant disclosures of both of those applications are hereby incorporated by reference.

Examples of aqueous tackifier compounds suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof. In particular embodiments, the aqueous tackifier compound comprises FDP-S706-03, a polyacrylate ester commercially available from Halliburton Energy Services, Inc., of Duncan, Okla. Additional information on suitable materials may be found in U.S. patent application Ser. Nos. 10/864,061 and 10/864,618, both filed Jun. 9, 2004, the relevant disclosures of which are hereby incorporated by reference. In some embodiments, the aqueous tackifier compound comprises from about 0.1% to about 40% by weight of the aqueous tackifying composition. In some embodiments the aqueous tackifier compound comprises from about 2% to about 30% by weight of the aqueous tackifying composition The aqueous tackifying compositions of the present invention may also include an activator used to activate (i.e., tackify) the tackifier compound. As used in the present invention, the term "tacky," in all of its forms, generally refers to a substance having a nature such that it is (or may be activated to become) somewhat sticky to the touch. Typically, the activator is an organic acid (or an anhydride of an organic acid that is capable of hydrolyzing in water to create an organic acid), an inorganic acid, an inorganic salt (such as a brine), a charged surfactant, a charged polymer, or a combination thereof. However, any substance that is capable of making the aqueous tackifier compound insoluble in an aqueous solution may be used as an activator in accordance with the teachings of the present invention. The choice of an activator may vary, depending on, inter alia, the choice of aqueous tackifier compound.

An example of one activator suitable for use in the present invention is an acetic acid/acetic anhydride blend. Other acids, acids salts, anhydrides, and mixtures thereof may be also suitable. In particular embodiments, the activation process may be analogous to coagulation. For example, many natural rubber latexes may be coagulated with acetic or formic acid during the manufacturing process. Suitable salts include, but are not limited to, sodium chloride, potassium chloride, calcium chloride, and mixtures thereof. In another exemplary embodiment of the present invention, the concentration of salts present in the formation water itself may be sufficient to activate the tackifier compound. In such an embodiment it may not be necessary to add an additional activator. Generally, when used, the activator is present in an amount in the range of from about 1% to about 40% by weight of the aqueous tackifying composition; however, in some cases (such as with brines) the activator may be present in excess. The amount of activator present in the aqueous tackifier compound may depend on, inter alia, the amount of aqueous tackifier compound present and/or the desired rate of reaction. Additional information on suitable materials may be found in U.S. patent application Ser. Nos. 10/864,061 and 10/864,618, both filed Jun. 9, 2004, the relevant disclosures of which are hereby incorporated by reference.

In particular embodiments, the aqueous tackifying composition of the present invention may further comprise a surfactant. Generally, a surfactant may facilitate the coating of an aqueous tackifier compound onto a particulate being treated. Typically, the aqueous tackifier compounds of the present invention preferentially attach to particulates having an opposite charge. For instance, an aqueous tackifier compound having a negative charge will preferentially attach to surfaces having a positive to neutral zeta potential and/or a hydrophobic surface. Similarly, using analogous chemistry, positively-charged aqueous tackifier compound will preferentially attach to negative to neutral zeta potential and/or a hydrophilic surfaces. Therefore, in particular embodiments of the present invention, a cationic surfactant may be included in the aqueous tackifying composition to facilitate the application of the negatively-charged aqueous tackifier compound to a particulate having a negative zeta potential. As will be understood by one skilled in the art, amphoteric and zwitterionic surfactants may also be used so long as the conditions they are exposed to during use are such that they display the desired charge. For example, in particular embodiments, mixtures of cationic and amphoteric surfactants may be used. In some embodiments, the surfactant is present in an amount of from about 0.1% to about 15% by weight of the aqueous tackifying composition. In some embodiments, the surfactant is present in an amount of from about 1% to about 5% by weight of the aqueous tackifying composition. Any surfactant compatible with the aqueous tackifying composition may be used in the present invention. Such surfactants include, but are not limited to, ethoxylated nonyl phenol phosphate esters, mixtures of one or more cationic surfactants, one or more non-ionic surfactants, and an alkyl phosphonate surfactant. Suitable mixtures of one or more cationic and nonionic surfactants are described in U.S. Pat. No. 6,311,773 issued to Todd et al. on Nov. 6, 2001, the disclosure of which is incorporated herein by reference. A $C_{12}$-$C_{22}$ alkyl phosphonate surfactant may be preferred.

In particular embodiments, the aqueous tackifying composition of the present invention may further comprise a solvent. Such a solvent may be used, among other things, to reduce the viscosity of the aqueous tackifying composition where desired. In embodiments using a solvent, it is within the ability of one skilled in the art, with the benefit of this disclosure, to determine how much solvent is needed to achieve a viscosity suitable to the subterranean conditions. Any solvent that is compatible with the aqueous tackifier compound and achieves the desired viscosity effects is suitable for use in the present invention. The solvents that can be used in the present invention preferably include those having high flash points (most preferably above about 125° F.). Examples of some solvents suitable for use in the present invention include, but are not limited to, water, butylglycidyl ether, dipropylene glycol methyl ether, butyl bottom alcohol, dipropylene glycol dimethyl ether, diethyleneglycol methyl ether, ethyleneglycol butyl ether, diethyleneglycol butyl ether, propylene carbonate, butyl lactate, dimethyl sulfoxide, dimethyl formamide, fatty acid methyl esters, and combinations thereof.

The aqueous liquid present in the aqueous tackifying composition may be fresh water, salt water, seawater, or brine, provided the salinity of the water source does not inadvertently activate the hydrophobic polymers of the present invention. Typically, the water is present in an amount of from about 0.1% to about 98% by weight of the aqueous tackifying composition.

While many potential methods exist for determining an aqueous tackifier compound suitable for use in accordance with the present invention, one practical method of choosing a suitable polymer is as follows: place the polymer being tested in concentrated form (i.e., about 20-50% concentration) and add an activator to it. If the mixture, empirically, appears to coagulate to form a solid or semisolid mass than the polymer represents a suitable tackifier compound according to the present invention. If the mixture does not appear to coagulate to form a solid or semisolid mass, then another activator should be chosen and the test repeated. One skilled in the art, knowing the desired result of coagulation, will be able to select likely activators. For example, when testing an acrylate-based polymer for suitability as an aqueous tackifier, an mixture comprising 50% acetic anhydride and 50% glacial acetic acid by volume is a likely activator. The choice of tackifier compound may depend, inter alia, on the down hole conditions (e.g., salinity, temperature, and/or pH). However, the relationship between these and other down hole conditions may not be uniform across all suitable aqueous tackifier compounds. For instance, high salinity might accelerate activation for some aqueous tackifier compounds while delaying activation for others. One skilled in the art will be able to determine the effect of the particular down hole conditions on the chosen tackifier compound. For example, with polyacrylate polymers, high salinity and/or extremes of pH (e.g., either above about 9 or below about 5) generally accelerate activation.

In particular embodiments, the aqueous tackifier compounds of the present invention may offer numerous advantages over traditional tackifier compounds. Unlike some tackifier compounds which require aromatic solvents, the tackifier compounds of the present invention are aqueous-based, using water as a solvent. This may make the tackifier compounds more environmentally-friendly than traditional tackifiers. The aqueous tackifier compounds of the present invention also typically have extremely low viscosities prior to activation, contributing to their ease of handling. Additionally, once activated, the tackifier compounds of the present invention are typically more pliable or elastic than traditional tackifier compounds, and, unlike many resins, do not cure to a solid state, allowing them to be reformed multiple times over the useful life of the tackifier compound.

Once at least partially coated with the aqueous tackifying composition, the particulates (be they proppant/gravel particulates, non-proppant/gravel particulates, or a combination thereof) are typically added to a treatment fluid for placement into a subterranean formation. Generally, any fluid suitable for a fracturing, gravel-packing, or frac-packing application may be used in accordance with the teachings of the present invention, including aqueous gels, viscoelastic surfactant gels, foamed gels and emulsions. Suitable aqueous gels are generally comprised of water and one or more gelling agents. Suitable emulsions can be comprised of two immiscible liquids such as an aqueous liquid or gelled liquid and a hydrocarbon. Foams can be created by the addition of a gas, such as carbon dioxide or nitrogen. In exemplary embodiments of the present invention, the treatment fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, treatment fluid, inter alia, reduces fluid loss and allows the treatment fluid to transport significant quantities of suspended proppant particles. The water used to form the treatment fluid may be fresh water, salt water, brine, sea water, or any other aqueous liquid that does not adversely react with the other components. The density of the water can be increased to provide additional particle transport and suspension in the present invention.

A variety of gelling agents may be used, including hydratable polymers that contain one or more functional groups such as hydroxyl, carboxyl, sulfate, sulfonate, amino, or amide groups. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the viscosified treatment fluids of the present invention in an amount in the range of from about 0.1% to about 5% by weight of the water therein. In certain exemplary embodiments, the gelling agents are present in the viscosified treatment fluids of the present invention in an amount in the range of from about 0.01% to about 2% by weight of the water therein.

Crosslinking agents may be used to crosslink gelling agent molecules to form crosslinked gelling agents. Crosslinkers typically comprise at least one ion that is capable of crosslinking at least two gelling agent molecules. Examples of suitable crosslinkers include, but are not limited to, boric acid, disodium octaborate tetrahydrate, sodium diborate, pentaborates, ulexite and colemanite, compounds that can supply zirconium IV ions (such as, for example, zirconium lactate, zirconium lactate triethanolamine, zirconium carbonate, zirconium acetylacetonate, zirconium malate, zirconium citrate, and zirconium diisopropylamine lactate); compounds that can supply titanium IV ions (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan Okla. Suitable crosslinkers generally are present in the viscosified treatment fluids of the present invention in an amount sufficient to provide, inter alia, the desired degree of crosslinking between gelling agent molecules. In certain exemplary embodiments of the present invention, the crosslinkers may be present in an amount in the range from about 0.001% to about 10% by weight of the water in the treatment fluid. In certain exemplary embodiments of the present invention, the crosslinkers may be present in the viscosified treatment fluids of the present invention in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked treatment fluids may also include internal delayed gel breakers such as enzyme, oxidizing, acid buffer, or temperature-activated gel breakers. The gel breakers cause the viscous treatment fluids to revert to thin fluids that can be produced back to the surface after they have been used to place proppant particles in subterranean fractures. The gel breaker used is typically present in the treatment fluid in an amount in the range of from about 0.5% to about 10% by weight of the gelling agent. The treatment fluids may also include one or more of a variety of well-known additives, such as gel stabilizers, fluid loss control additives, clay stabilizers, bactericides, and the like.

To facilitate a better understanding of the present invention, the following examples of preferred embodiments are given. In no way should the following examples be read to limit or define the scope of the invention.

EXAMPLES

Example 1

A sample of 20/40 Brady Sand was treated (41.25% polyacrylate ester polymer concentrate, 3.75% 1:1 mixture of 19N Surfactant (a cationic surfactant available from Halliburton Energy Services, Duncan Okla.) and 0.1% HY-CLEAN (HC-2) Surfactant (an amphoteric surfactant available from Halliburton Energy Services, Duncan Okla.), 30% water. That treatment was then followed by solution of 25% activator (at about 2% (v/w) based on total treatment fluid volume) wherein the activator used was an acetic acid/acetic anhydride blend. This sample was then placed in a T-test as described as follows. The evaluation of a liquid or solution of a compound for use as a tackifying compound may be accomplished by the following test: First, a critical resuspension velocity is determined for the material upon which the tackifying compound is to be coated. One suitable test apparatus comprises a ½" glass tee that is connected to an inlet source of water and an outlet disposal line is blocked to fluid flow. A water-based slurry of particulates is aspirated into the tee through inlet and collected within portion by filtration against a screen. When portion of tee is full, the vacuum source is removed and a plug is used to seal the end of portion. The flow channel from inlet to outlet then is swabbed clean and a volumetrically controlled pump is connected to inlet and a controlled flow of water is initiated. The velocity of the fluid is slowly increased through inlet until the first particle of particulate material is picked up by the flowing water stream. This determines the baseline for the starting of the resuspension velocity. Next, the flow rate then is further increased until the removal of particles becomes continuous. This determines the baseline for the continuous resuspension velocity. Next, the test may then be terminated and the apparatus is refilled with particulate having a coating corresponding to about 0.5 percent active material by weight of the particulate applied thereto. Similar trends generally are seen in the results when the concentrations tested are from about 0.1 to about 3 percent, however, the 0.5 percent level which is within the preferred application range is preferred for standardization of the procedure. The test may be repeated to determine the starting point of particulate removal and the velocity at which removal becomes continuous. The percent of velocity increase (or decrease) then is determined based upon the initial or continuous baseline value.

Effectively treated proppant will resist transport as compared to untreated proppant. The test sample did not show signs of movement even when the test apparatus flowed at its maximum rate of 2,000 mL/min. Untreated 20/40 Brady Sand started flowing at 154 mL/min; the treated sand resisted flowing at fluid rates over 13-times faster than untreated sand.

Example 2

A 1 g sample of 20/40 Brady sand was added to 1 mL FDP-S706-03 (40% active acrylate polymer concentrate), 1 g encapsulated citric acid (FDP-S602-00 available from Halliburton Energy Services, Duncan Okla.), and 8 mL water. Then, 1 mL of acetic acid/acetic anhydride activator was added with agitation. The particles consolidated into a cohesive cluster within about 10 minutes without separation of the encapsulated acid and the sand.

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method for controlling particulate segregation within slurries comprising:
   providing a mixture of an aqueous tackifying composition with a treatment fluid;
   creating a slurry by slurrying into mixture of an aqueous tackifying composition with a treatment fluid: a first type of solid particulates and a second type of solid particulates and wherein the first type of solid particulates have a tendency to segregate from the second type of solid particulates when slurried into a liquid; and,
   placing the slurry into a portion of a subterranean formation.

2. The method of claim 1 wherein the treatment fluid is selected from the group consisting of: an aqueous gel, a viscoelastic surfactant gel, a foamed gel, and an emulsion.

3. The method of claim 1 wherein the treatment fluid comprises an aqueous gel that comprises water and one or more gelling agents.

4. The method of claim 1 wherein the treatment fluid is crosslinked.

5. The method of claim 1 wherein the treatment fluid further comprises an additive selected from the group consisting of: a delayed gel breaker, a gel stabilizer, a fluid loss control additive, a clay stabilizer, a bactericide, and combinations thereof.

6. The method of claim 1 wherein the first type of solid particulates is selected from the group consisting of: proppant particulates, gravel particulates, and mixtures thereof.

7. The method of claim 1 wherein the second type of solid particulates is selected from the group consisting of: proppant particulates having a tendency to segregate from the first type of solid particulates, gravel particulates having a tendency to segregate from the first type of solid particulates, non-proppant/gravel particulates having a tendency to segregate from the first type of solid particulates, and mixtures thereof.

8. The method of claim 1 wherein the second type of solid particulates is selected from the group consisting of: a scale inhibitor, a gel breaker, a hydrate inhibitor, a corrosion inhibitor, a paraffin remover, a salt, and an encapsulated acid.

9. The method of claim 1 wherein the first type of solid particulates differs from the second type of solid particulates, and wherein the difference is selected from the group consisting of: a different size, a different shape, a different density, a different settling rate, and combinations thereof.

10. The method of claim 1 wherein the aqueous tackifying composition comprises an aqueous liquid and an aqueous tackifier compound.

11. The method of claim 10 wherein the aqueous liquid is selected from the group consisting of: fresh water, salt water, seawater, and brine.

12. The method of claim 10 wherein the aqueous tackifier compound is selected from the group consisting of: an acrylic acid polymer, an acrylic acid ester polymer, an acrylic acid derivative polymer, an acrylic acid homopolymer, an acrylic acid ester homopolymer, an acrylic acid ester co-polymer, a methacrylic acid derivative polymer, a methacrylic acid homopolymer, a methacrylic acid ester homopolymer, an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, and copolymers thereof.

13. The method of claim 10 wherein the aqueous tackifying composition further comprises an activator.

14. The method of claim 13 wherein the activator is selected from the group consisting of: an organic acid, an anhydride of an organic acid, an inorganic acid, an inorganic salt, a charged surfactant, a charged polymer, and combinations thereof.

15. The method of claim 13 wherein the activator comprises an acetic acid/acetic anhydride blend.

16. The method of claim 13 wherein the activator is present in an amount of from about 3% to about 25% by weight of the aqueous tackifier compound.

17. The method of claim 10 wherein the aqueous tackifying composition further comprises a surfactant.

18. The method of claim 17 wherein the surfactant is selected from the group consisting of: an ethoxylated nonyl phenol phosphate ester, a cationic surfactant, a non-ionic surfactant, and an alkyl phosphonate surfactant.

19. The method of claim 17 wherein the surfactant is present in the aqueous tackifying composition in an amount ranging from about 0.1% to about 15% by weight of the aqueous fluid.

20. The method of claim 10 wherein the aqueous tackifying composition further comprises a solvent.

21. The method of claim 20 wherein the solvent is selected from the group consisting of: water, a butylglycidyl ether, a dipropylene glycol methyl ether, a butyl bottom alcohol, a dipropylene glycol dimethyl ether, a diethyleneglycol methyl ether, an ethyleneglycol butyl ether, a diethyleneglycol butyl ether, a propylene carbonate, a butyl lactate, a dimethyl sulfoxide, a dimethyl formamide, a fatty acid methyl ester, and combinations thereof.

22. A method for forming a proppant pack within a portion of a subterranean formation, comprising:
   providing a treatment fluid comprising a fracturing fluid and an aqueous tackifying composition;
   creating a slurry by slurrying into the treatment fluid: a first type of solid particulates and a second type of solid particulates and wherein the first type of solid particulates have a tendency to segregate from the second type of solid particulates when slurried into a liquid; and,
   introducing the slurry into a fracture within the portion of the subterranean formation so as to form a proppant pack comprising a substantially uniform mixture of the first type of solid particulates and the second type of solid particulates.

23. The method of claim 22 wherein the fracturing fluid is selected from the group consisting of: an aqueous gel, a viscoelastic surfactant gel, a foamed gel, and an emulsion.

24. The method of claim 22 wherein the fracturing fluid further an additive selected from the group consisting of: a delayed gel breaker, a gel stabilizer, a fluid loss control additive, a clay stabilizer, a bactericide, and combinations thereof.

25. The method of claim 22 wherein the first type of solid particulates are proppant particulates.

26. The method of claim 22 wherein second type of solid particulates is selected from the group consisting of: proppant particulates having a tendency to segregate from the first type of solid particulates, non-proppant particulates having a tendency to segregate from the first type of solid particulates, and mixtures thereof.

27. The method of claim 22 wherein the second type of solid particulates comprise non-proppant particulates and wherein the non-proppant particulates is selected from the group consisting of: a scale inhibitor, a gel breaker, a hydrate inhibitor, a corrosion inhibitor, a paraffin remover, a salt, and an encapsulated acid.

28. The method of claim 22 wherein the first type of solid particulates differs from the second type of solid particulates, and wherein the difference is selected from the group consisting of: a different size, a different shape, a different density, a different settling rate, and combinations thereof.

29. The method of claim 22 wherein the aqueous tackifying composition comprises an aqueous liquid and an aqueous tackifier compound.

30. The method of claim 29 wherein the aqueous tackifier compound is selected from the group consisting of: an acrylic acid polymer, an acrylic acid ester polymer, an acrylic acid derivative polymer, an acrylic acid homopolymer, an acrylic acid ester homopolymer, an acrylic acid ester co-polymer, a methacrylic acid derivative polymer, a methacrylic acid homopolymer, a methacrylic acid ester homopolymer, an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, and copolymers thereof.

31. The method of claim 29 wherein the aqueous tackifying composition further comprises an activator selected from the group consisting of an organic acid, an anhydride of an organic acid, an inorganic acid, an inorganic salt, a charged surfactant, a charged polymer, and combinations thereof.

32. The method of claim 31 wherein the activator is present in an amount of from about 3% to about 25% by weight of the aqueous tackifier compound.

33. The method of claim 29 wherein the aqueous tackifying composition further comprises a surfactant selected from the group consisting of an ethoxylated nonyl phenol phosphate ester, a cationic surfactant, a non-ionic surfactant, and an alkyl phosphonate surfactant.

34. The method of claim 33 wherein the surfactant is present in the aqueous tackifying composition in an amount ranging from about 0.1% to about 15% by weight of the aqueous fluid.

35. The method of claim 29 wherein the aqueous tackifying composition further comprises a solvent.

36. A method for forming a gravel pack within a portion of a subterranean formation, comprising:
providing a treatment fluid comprising a gravel packing fluid and an aqueous tackifying composition;
creating a slurry by slurrying into the treatment fluid: a first type of solid particulates and a second type of solid particulates and wherein the first type of solid particulates have a tendency to segregate from the second type of solid particulates when slurried into a liquid; and,
introducing the slurry into a portion of a well bore within the portion of the subterranean formation so as to form a gravel pack comprising a substantially uniform mixture of the first type of solid particulates and the second type of solid particulates.

37. The method of claim 36 wherein the gravel packing fluid is selected from the group consisting of: an aqueous gel, a viscoelastic surfactant gel, a foamed gel, and an emulsion.

38. The method of claim 36 wherein the gravel packing fluid further comprises an additive selected from the group consisting of: a delayed gel breaker, a gel stabilizer, a fluid loss control additive, a clay stabilizer, a bactericide, and combinations thereof.

39. The method of claim 36 wherein the first type of solid particulates are proppant particulates.

40. The method of claim 36 wherein second type of solid particulates is selected from the group consisting of: proppant particulates having a tendency to segregate from the first type of solid particulates, and non-proppant particulates having a tendency to segregate from the first type of solid particulates.

41. The method of claim 36 wherein the second type of solid particulates comprise non-proppant particulates and wherein the non-proppant particulates is selected from the group consisting of: a scale inhibitor, a gel breaker, a hydrate inhibitor, a corrosion inhibitor, a paraffin remover, a salt, and an encapsulated acid.

42. The method of claim 36 wherein the first type of solid particulates differs from the second type of solid particulates, and wherein the difference is selected from the group consisting of: a different size, a different shape, a different density, a different settling rate, and combinations thereof.

43. The method of claim 36 wherein the aqueous tackifying composition comprises an aqueous liquid and an aqueous tackifier compound.

44. The method of claim 43 wherein the aqueous tackifier compound is selected from the group consisting of: an acrylic acid polymer, an acrylic acid ester polymer, acrylic acid derivative polymer, an acrylic acid homopolymer, an acrylic acid ester homopolymer, an acrylic acid ester co-polymer, a methacrylic acid derivative polymer, a methacrylic acid homopolymer, a methacrylic acid ester homopolymer, an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, and copolymers thereof.

45. The method of claim 43 wherein the aqueous tackifying composition further comprises an activator selected from the group consisting of an organic acid, an anhydride of an organic acid, an inorganic acid, an inorganic salt, a charged surfactant, a charged polymer, and combinations thereof.

46. The method of claim 45 wherein the activator is present in an amount of from about 3% to about 25% by weight of the aqueous tackifier compound.

47. The method of claim 43 wherein the aqueous tackifying composition further comprises a surfactant selected from the group consisting of an ethoxylated nonyl phenol phosphate ester, a cationic surfactant, a non-ionic surfactant, and an alkyl phosphonate surfactant.

48. The method of claim 47 wherein the surfactant is present in the aqueous tackifying composition in an amount ranging from about 0.1% to about 15% by weight of the aqueous fluid.

49. The method of claim 43 wherein the aqueous tackifying composition further comprises a solvent.

* * * * *